United States Patent [19]

Drahnak

[11] Patent Number: 4,530,879

[45] Date of Patent: Jul. 23, 1985

[54] RADIATION ACTIVATED ADDITION REACTION

[75] Inventor: Timothy J. Drahnak, St. Paul, Minn.

[73] Assignee: Minnesota Mining and Manufacturing Company, St. Paul, Minn.

[21] Appl. No.: 472,158

[22] Filed: Mar. 4, 1983

[51] Int. Cl.[3] .................... C08G 77/08; C08G 77/12; C09J 7/02

[52] U.S. Cl. ............... 428/352; 204/159.13; 204/158 R; 204/162 R; 428/343; 428/345; 428/354; 428/447; 528/15; 528/31; 528/32; 526/279; 526/171

[58] Field of Search .................. 528/15, 31, 32; 526/279, 171; 204/159.13, 158 R, 162 R; 428/447, 40-42, 352, 343, 345, 354

[56] References Cited

U.S. PATENT DOCUMENTS

| | | | |
|---|---|---|---|
| 3,159,662 | 12/1964 | Ashby | 260/448 |
| 3,178,464 | 4/1965 | Pierpoint | 260/448 |
| 3,220,972 | 11/1965 | Lamoreaux | 260/46.5 |
| 3,313,773 | 4/1967 | Lamoreaux | 260/46.5 |
| 3,410,886 | 11/1968 | Joy | 260/448 |
| 3,470,225 | 9/1969 | Knorre et al. | 260/448 |
| 3,567,755 | 3/1971 | Seyfried et al. | 260/448 |
| 3,814,731 | 6/1974 | Nitzsche et al. | 260/46.5 |
| 4,276,252 | 6/1981 | Kreis et al. | 264/222 |
| 4,288,345 | 9/1981 | Ashby et al. | 252/431 |
| 4,332,654 | 6/1982 | Yates | 204/158 |

OTHER PUBLICATIONS

Robert A. Faltynek, "Transition–Metal Photocatalysis: Rhodium(I)–Promoted Hydrosilation Reactions", *Inorg. Chem.* 1981, 20 (5), pp. 1357–1362.

Gregory L. Geoffroy, *Organometallic Photochemistry*, (New York: Academic Press, 1979) pp. 319–323.

C. R. Kristner, J. H. Hutchinson, J. R. Doyle and J. C. Storlie, "Metal–Olefin Compounds, IV, The Preparation and Properties of Some Aryl and Alkyl Platinum-(II)–Olefin Compounds", *Inorg. Chem.* 2 (6), (1963), p. 1255.

M. Aresta and R. S. Nyholm, "Chelate Compounds of Platinum(II) Containing Only Sigma and Pi Carbon--to-Metal Bonds", *J. Chem. Soc. D.* (22), (1971), pp. 1459–1460.

*Primary Examiner*—Ellis P. Robinson
*Attorney, Agent, or Firm*—Donald M. Sell; James A. Smith; David L. Weinstein

[57] ABSTRACT

A process for the addition of compounds containing silicon-bonded hydrogen to compounds containing aliphatic unsaturation. The process is activated by actinic radiation and is conducted in the presence of a platinum complex having an ultraviolet displaceable group.

18 Claims, No Drawings

RADIATION ACTIVATED ADDITION REACTION

This invention relates to a process for reacting a compound containing silicon-bonded hydrogen with a compound containing aliphatic unsaturation in the presence of actinic radiation, and to compositions which contain an actinic radiation-sensitive catalyst that are useful in said process. The invention further relates to polysiloxane compositions, prepared by said process, which compositions are useful for preparing release-coated substrates.

Numerous patents teach the use of various complexes of cobalt, rhodium, or platinum as catalysts for accelerating the thermally-activated addition reaction between a compound containing silicon-bonded hydrogen and a compound containing aliphatic unsaturation. For example, U.S. Pat. No. 4,288,345 discloses as a catalyst for hydrosilation reactions a platinum-siloxane complex catalyst. U.S. Pat. No. 3,470,225 discloses production of organic silicon compounds by addition of silicon compounds containing at least one hydrogen atom bound directly to silicon to organic compounds containing at least one non-aromatic double or triple carbon-to-carbon bond using a platinum compound of the empirical formula $PtX_2(RCOCR'COR'')_2$ wherein X is halogen, R is alkyl, R' is hydrogen or alkyl, and R'' is alkyl or alkoxy. The catalysts disclosed in the foregoing patents are characterized by their high catalytic activity. Other platinum complexes for accelerating the aforementioned thermally-activated addition reaction include: a platinum-cyclopropane complex having the formula $(PtCl_2-C_3H_6)_2$ (U.S. Pat. No. 3,159,662); a complex of a platinous salt and an olefin (U.S. Pat. No. 3,178,464); a platinum-containing complex prepared by reacting chloroplatinic acid with an alcohol, ether, aldehyde, or mixtures thereof (U.S. Pat. No. 3,220,972); a platinum compound selected from trimethylplatinum iodide and hexamethyldiplatinum (U.S. Pat. No. 3,313,773); a hydrocarbyl or halohydrocarbyl nitrile-platinum (II) halide complex (U.S. Pat. No. 3,410,886); a hexamethyl-dipyridine-diplatinum iodide (U.S. Pat. No. 3,567,755); a platinum curing catalyst obtained from the reaction of chloroplatinic acid and a ketone having up to 15 carbon atoms (U.S. Pat. No. 3,814,731); and a platinum compound having the general formula $(R')PtX_2$ where R' is a cyclic hydrocarbon radical or substituted cyclic hydrocarbon radical having two aliphatic carbon-carbon double bonds, and X is a halogen atom or alkyl radical (U.S. Pat. No. 4,276,252). Although these platinum complexes and many others are useful as catalysts in processes for accelerating the thermally-activated addition reaction between compounds containing silicon-bonded hydrogen and compounds containing aliphatic unsaturation, processes for accelerating the ultraviolet radiation activated addition reaction between these compounds, utilizing a platinum complex as a catalyst, are not known. Although U.S. Pat. No. 4,332,654 discloses a process for contacting carbonyl compound with an organosilicon hydride in the presence of a transition metal carbonyl coordination compound and then irradiating the mixture to form a silyl ether, complexes of platinum are not included among useful catalysts for that process. Faltynek, "Inorganic Chemistry", 20(5), 1357-1362, (1981), discloses that rhodium complexes are active photocatalyst precursors for the hydrosilation reaction. However, rhodium complexes exhibit much lower catalytic activity than do platinum complexes.

In one aspect, this invention is an improved process for the actinic radiation-activated addition reaction of a compound containing silicon-bonded hydrogen with a compound containing aliphatic unsaturation, said addition being referred to as hydrosilation. The process is applicable both to the synthesis of low molecular weight compounds and to the curing of high molecular weight compounds, i.e. polymers, containing unsaturated groups, e.g.,

The process comprises exposing to actinic radiation, e.g., ultraviolet radiation, a composition comprising (a) a compound containing silicon-bonded hydrogen, for example,

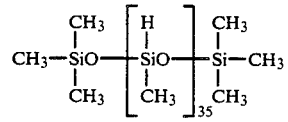

(b) a compound containing aliphatic unsaturation, for example,

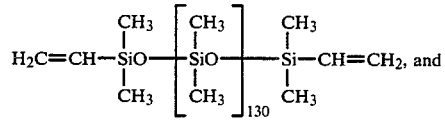

(c) a platinum complex having an ultraviolet displaceable group, for example, ($\eta^4$-1,5-cyclooctadiene)diphenylplatinum.

The invention further involves novel compositions containing the aforementioned platinum complex.

An important application of the process and compositions of the invention is the in situ curing of polymeric silicone composition to a solid surface to provide a non-stick character to the surface.

Advantages of the platinum complex in accelerating the radiation-activated addition reaction of compounds containing silicon-bonded hydrogen with compounds containing aliphatic unsaturation are:

(1) since heat is not required, the addition reaction can be carried out on the surface of a heat-sensitive substrate without adversely affecting the substrate;
(2) radiation curing consumes less energy than does thermal curing; and
(3) platinum complexes exhibit higher catalytic activity than do other metal complexes.

As used in this application, the term "compound", unless indicated otherwise, includes both monomeric compounds and polymeric compounds. As used in this application, the term "hydrosilation" means the addition of organosilicon compounds containing silicon-bonded hydrogen to a compound containing an aliphatic multiple bond. More particularly, the hydrosilation process described in this application refers to those processes in which platinum-containing catalysts are used to effect the addition of an organosilicon compound having a silicon-bonded hydrogen atom to an aliphatically unsaturated compound having either olefinic or acetylenic unsaturation.

Platinum complexes that have an ultraviolet displaceable group have been described in G. L. Geoffroy, *Organometallic Photochemistry*, Academic Press, Inc., New York, N.Y., (1979), pp. 319–323. Platinum complexes that are useful in the process of the present invention have one or two ethylenically-unsaturated ligands that are pi-bonded to platinum and one or two hydrocarbyl groups that are sigma-bonded to the platinum, of which at least one of said hydrocarbyl groups or ethylenically-unsaturated ligands or both is displaceable upon irradiation with ultraviolet radiation.

In a preferred embodiment of the invention, the platinum complex having an ultraviolet displaceable group is a ($\eta$-diolefin)($\sigma$-aryl)platinum complex having the formula:

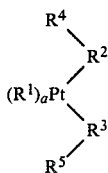   I wherein
- $R^1$ is an alkadiene that is $\pi$-bonded to platinum, the alkadiene being a straight or branched chain group and preferably containing 4 to 12 carbon atoms, or a carbocyclic 6- to 8-membered ring preferably containing 6 to 12 carbon atoms, the alkadiene further being either unsubstituted or substituted by one of more groups that are inert in a hydrosilation reaction;
- $R^2$ and $R^3$ are aryl radicals that are $\sigma$-bonded to platinum and are independently selected from monocyclic and polycyclic aryl radicals preferably containing 6 to 18 carbon atoms, said aryl radicals being either unsubstituted or substituted by one or more groups that are inert in a hydrosilation reaction;
- $R^4$ and $R^5$ are each independently hydrogen, or an ortho-alkenyl radical preferably having 2 to 6 carbon atoms in a straight or branched chain, or a cycloalkenyl radical with 5 or 6 carbon ring members, the unsaturated bond of the alkenyl or cycloalkenyl radical being in the 2- or 3-position with respect to the $\sigma$-bonded position; and
- $a$ is zero or one, being zero only when both $R^4$ and $R^5$ are said ortho-alkenyl radicals and being 1 when either $R^4$ or $R^5$ is not said ortho-alkenyl radical.

The ($\eta$-diolefin) ($\sigma$-aryl)platinum catalysts are preferred for use in the process of this invention because they absorb ultraviolet radiation better than do platinum catalysts not having $\sigma$-aryl radicals, and, therefore, can provide effective catalyzation for the process when present in the curable composition. However, platinum catalysts having an ultraviolet displaceable group, but not containing aryl radicals, are also within the scope of this invention.

The ($\eta$-diolefin) ($\sigma$-aryl)platinum complexes can be prepared by the reaction of ($\eta$-olefin)platinum dihalides with an aryl Grignard reagent according to the procedure taught by C. R. Kistner, et al, "Inorg. Chem." 2 (6), 1255 (1963). Mixed diaryl complexes can be prepared by using two aryl Grignard reagents. The preparation may be complicated by aryl exchanges so that reaction products are likely to be mixtures of bis(aryl$^1$), bis(aryl$^2$), and (aryl$^1$-aryl$^2$) complexes. Complexes having an alkenylaryl group, such as bis[$\eta^2$-2-(2-propenyl)-phenyl]platinum, can be prepared by the reaction of an alkenylphenyl Grignard reagent with platinum halide in accordance with the procedure taught by Aresta et al, "J. Chem. Soc. D.", (22) 1459-60, (1971).

Representative examples of suitable ($\eta$-diolefin) ($\sigma$-aryl)platinum complexes useful in the practice of this invention include the following, in which, for the sake of simplification, "COD" signifies cyclooctadiene, "COT" signifies cyclooctatetraene, and "NBD" signifies norboradiene:

($\eta^4$-1,5-COD)diphenylplatinum
($\eta^4$-1,3,5,7-COT)diphenylplatinum
($\eta^4$-2,5-NBD)diphenylplatinum
($\eta^4$-3a,4,7,7a-tetrahydro-4,7-methanoindene)diphenylplatinum
($\eta^4$-1,5-COD)-bis(4-methylphenyl)platinum
($\eta^4$-1,5-COD)-bis(2-methylphenyl)platinum
($\eta^4$-1,5-COD)-bis(2-methoxyphenyl)platinum
($\eta^4$-1,5-COD)-bis(3-methoxyphenyl)platinum
($\eta^4$-1,5-COD)-bis(4-phenoxyphenyl)platinum
($\eta^4$-1,5-COD)-bis(4-methylthiophenyl)platinum
($\eta^4$-1,5-COD)-bis(3-chlorophenyl)platinum
($\eta^4$-1,5-COD)-bis(4-fluorophenyl)platinum
($\eta^4$-1,5-COD)-bis(4-bromophenyl)platinum
($\eta^4$-1,5-COD)-bis(4-trifluoromethylphenyl)platinum
($\eta^4$-1,5-COD)-bis(3-trifluoromethylphenyl)platinum
($\eta^4$-1,5-COD)-bis(2,4-bis(trifluoromethyl)phenyl)-platinum
($\eta^4$-1,5-COD)-bis(4-dimethylaminophenyl)platinum
($\eta^4$-1,5-COD)-bis(4-acetylphenyl)platinum
($\eta^4$-1,5-COD)-bis(trimethylsilyloxyphenyl)platinum
($\eta^4$-1,5-COD)-bis(trimethylsilylphenyl)platinum
($\eta^4$-1,5-COD)-bis(pentafluorophenyl)platinum
($\eta^4$-1,5-COD)-bis(4-benzylphenyl)platinum
($\eta^4$-1,5-COD)-bis(1-naphthyl)platinum
($\eta^4$-1,5-COD)-naphthylphenylplatinum
($\eta^4$-1,5-COD)-bis(2H-chromen-2-yl)platinum
($\eta^4$-1,5-COD)-bis(xanthen-1-phenyl)platinum
($\eta^4$-1,3,5-cycloheptatriene)diphenylplatinum
($\eta^4$-1-chloro-1,5-COD)diphenylplatinum
($\eta^4$-1,5-dichloro-1,5-COD)diphenylplatinum
($\eta^4$-1-fluoro-1,3,5,7-COT)diphenylplatinum
($\eta^4$-1,2,4,7-tetramethyl-1,3,5,7-COT)-bis(4-methylphenyl)platinum
($\eta^4$-7-chloro-2,5-NBD)diphenylplatinum
($\eta^4$-1,3-cyclohexadiene)diphenylplatinum
($\eta^4$-1,4-cyclohexadiene)diphenylplatinum
($\eta^4$-2,4-hexadiene)diphenylplatinum
($\eta^4$-2,5-heptadiene)diphenylplatinum
($\eta^4$-1,3-dodecadiene)diphenylplatinum
bis[$\eta^2$-2-(2-propenyl)phenyl]platinum
bis[$\eta^2$-2-(ethenylphenyl)platinum
bis[$\eta^2$-2-(cyclohexen-1-ylmethyl)phenyl]platinum Representative examples of platinum complexes, suitable for this invention, which do not contain aryl radicals but still have an ultraviolet displaceable group include the following:
($\eta^4$-1,5-COD)Pt(methyl)$_2$
($\eta^4$-1,5-COD)Pt(benzyl)$_2$
($\eta^4$-1,5-COD)Pt(hexyl)$_2$ Turning now to the reactants of the radiation-activated addition reaction, compounds containing aliphatic unsaturation which are useful in the present invention have olefinic or acetylenic unsaturation. These compounds are well-known in the art and are disclosed in such patents as Ashby, U.S. Pat. No. 3,159,662; Lamoreaux, U.S. Pat. No. 3,220,972; and Joy, U.S. Pat. No. 3,410,886. In instances where these compounds contain elements other than carbon and hydrogen, it is preferred that these elements be either oxygen, nitrogen, silicon, a halogen, or mixtures of these other elements. The aliphatically unsaturated compound can contain carbon-to-carbon multiple bonds, or it can contain a plurality of multiple bonds. Representative of the aliphatically unsaturated hydrocarbons which can be employed include mono-olefins, for example, ethylene, propylene, 2-pentene, diolefins, for example, divinylbenzene, cyclo-olefins, for example, cyclohexene and cycloheptene, and mono-alkynes, for example, acetylene, methyl acetylene, and vinyl acetylene. Higher molecular weight aliphatically unsaturated compounds having up to 20 to 30 atoms, or more, can also be used.

In addition to the previously mentioned aliphatically unsaturated compounds, oxygen-containing aliphatically unsaturated compounds can be used, especially where the unsaturation is ethylenic, such as methylvinyl ether, divinylether, phenylvinyl ether, monoallyl ether of ethylene glycol, allyl aldehyde, methylvinyl ketone, phenylvinyl ketone, acrylic acid, methacrylic acid, vinylacetic acid, vinyl acetate, and linolenic acid. Heterocyclic compounds containing aliphatic unsaturation in the ring, such as dihydrofuran, and dihydropyrene, are also suitable for the present invention.

The sulfur analogs of any of the unsaturated oxygen-containing materials can also be employed in the practice of the present invention. Halogenated derivatives of the previously mentioned aliphatically unsaturated compounds can be employed, including the acyl chlorides as well as compounds containing a halogen substituent on a carbon atom other than a carbonyl carbon atom. Such halogen-containing compounds include, for example, vinyl chloride, and the vinylchlorophenyl esters.

Unsaturated compounds containing nitrogen substituents such as acrylonitrile, alkyl cyanide, nitroethylene, etc., are also useful in the practice of the present invention.

Other unsaturated compounds useful in the practice of the present invention include polymers containing aliphatic unsaturation, such as the polyester resins prepared from polybasic saturated or unsaturated acids with polyhydric unsaturated alcohols, and the polyester resins prepared by reacting unsaturated polybasic acids with saturated polyhydric alcohols.

A particularly useful type of unsaturated compound which can be employed in the practice of the present invention are those compounds containing silicon, such as those compounds commonly referred to as organosilicon monomers or polymers. These unsaturated organosilicon compounds have at least one aliphatically unsaturated organic radical attached to silicon per molecule. The aliphatically unsaturated organosilicon compounds include silanes, polysilanes, siloxanes, silazanes, as well as monomeric or polymeric materials containing silicon atoms joined together by methylene or polymethylene groups or by phenylene groups.

Preferred among the aliphatically unsaturated organosilicon compounds useful in the present invention are the monomeric silanes having the empirical formula $$R_b^6 R_c^7 SiX_{(4-b-c)} \qquad II$$

the cyclopolysiloxanes having the empirical formula $$(R^6 R^7 SiO)_d \qquad III$$

and the polyorganosiloxanes having the empirical formula $$R_e^6 R_f^7 SiO_{(4-e-f)/2} \qquad IV$$

wherein $R^6$ is a monovalent aliphatic unsaturated hydrocarbyl radical, $R^7$ is a monovalent saturated hydrocarbyl radical, X is a hydrolyzable group, b is an integer from 1 to 3, inclusive, c is zero or an integer from 1 to 3, inclusive, the sum of b and c being 1 to 3, d is an integer from 3 to 18, inclusive, e is a number having a value of 0.0001 to 1, inclusive, and f is zero or a number such that the sum of e and f is equal to 1 to 3, inclusive.

Monovalent aliphatic unsaturated hydrocarbyl radicals represented by $R^6$ include alkenyl, for example, vinyl, propenyl, isopropenyl, 3-butenyl, and 5-hexenyl. Radicals represented by $R^7$ include, for example, alkyl radicals, such as methyl, ethyl, and pentyl; cycloalkyl radicals, such as cyclopentyl and cyclohexyl; aryl radicals such as phenyl and tolyl; aralkyl radicals, such as benzyl and phenylethyl; halogenated hydrocarbyl radicals, such as haloalkyl, e.g., chloromethyl, trichloromethyl, and 3,3,3-trifluoropropyl, and haloaryl, e.g., chlorophenyl. Hydrolyzable groups represented by X include, for example, halogen groups such as chloro, bromo, and iodo, alkoxy groups such as methoxy, ethoxy, and phenoxy, and acyloxy groups such as acetoxy, propionoxy, and benzoyloxy. A hydrolyzable group is one which undergoes a decomposition reaction with water.

In one particularly preferred embodiment of the process of the invention, the compound containing aliphatic unsaturation is an aliphatically unsaturated polyorganosiloxane represented by the general formula:

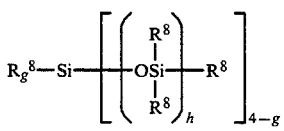

V wherein each $R^8$ is independently an unhalogenated or halogenated ethylenically-unsaturated radical having from 2 to 12 carbon atoms, such as the vinyl, propenyl, and chlorovinyl, an unhalogenated or halogenated alkyl radical having from 1 to 12 carbon atoms, such as the methyl, ethyl, propyl, hexyl, octyl, dodecyl, trichloromethyl, trifluoromethyl, and 3,3,3-trifluoropropyl, an unhalogenated or halogenated cycloalkyl radical having from 3 to 12 carbon atoms, such as the cyclopentyl and cyclohexyl, or phenyl radical, at least 90% of all $R^8$ radicals being methyl radicals, but no more than 10% of all $R^8$ radicals being vinyl or propenyl, and at least two of the $R^8$ radicals being vinyl or propenyl;

h is a number having a value from about 75 to 250 such that the polyorganovinylsiloxane has a viscosity from about 0.3 to 3 pascal-seconds (300 to 3000 centipoise) at 25° C.;

g is 0, 1, 2, or 3.

The reactant containing the silicon-hydrogen linkage can be a polymeric compound or a compound that is not polymeric. These compounds are well-known in the art and are disclosed in the patents which described the aliphatically unsaturated reactant, i.e., Ashby, U.S. Pat. No. 3,159,662; Lamoreaux, U.S. Pat. No. 3,220,972; and Joy, U.S. Pat. No. 3,410,886. The reactant containing the silicon-hydrogen linkage should contain at least one silicon-bonded hydrogen atom per molecule, with no more than two hydrogen atoms attached to any one silicon atom.

Some classes of compounds having a silicon-bonded hydrogen atom which can be used in the invention are hydrolyzable organosilanes having the empirical formula

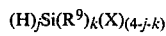
$(H)_j Si(R^9)_k (X)_{(4-j-k)}$  VI organocyclopolysiloxanes having the empirical formula

$(HR^9 SiO)_d$  VII and organohydrosiloxane polymers or copolymers having the empirical formula

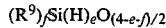
$(R^9)_f Si(H)_e O_{(4-e-f)/2}$  VIII wherein

R$^9$ is an organic radical, preferably selected from the group consisting of monovalent hydrocarbyl radicals, halogenated monovalent hydrocarbyl radicals, and cyanoalkyl radicals, j is the integer 1 or 2, k is zero or an integer of 1 to 3, inclusive, the sum of f and g being equal to 1 to 3, X, d, e and f are as defined above for formulas II, III, and IV.

Among the radicals represented by R$^9$ include, for example, alkyl radicals having 1 to 20 carbon atoms, e.g., methyl, ethyl, propyl, octyl, and octadecyl, cycloalkyl, radicals having 5 to 7 ring carbon atoms, e.g., cyclohexyl and cycloheptyl, aryl radicals having 6 to 18 carbon atoms, e.g., phenyl, naphthyl, tolyl, xylyl, and combinations of alkyl and aryl radicals, e.g., aralkyl radicals, such as, benzyl and phenyl ethyl, and halo-substituted radicals thereof, e.g., chloromethyl, chlorophenyl, and dibromophenyl. Preferably, the R$^9$ radical is methyl or both methyl and phenyl. The R$^9$ radical can also be an unsaturated aliphatic radical having 1 to 20 carbon atoms, such as alkenyl or cycloalkenyl, e.g., vinyl, allyl and cyclohexenyl. When the R$^9$ radical is a radical with aliphatic unsaturation, the silicon compound containing silicon-hydrogen linkages can be reacted with itself to form a polymer.

Among the non-polymeric inorganic compounds which contain silicon-bonded hydrogen atoms and which are useful as reactants in the process of the present invention are included, for example, trichlorosilane and dibromosilane. Among the operable inorganic polymeric compounds are included pentachlorodisilane, pentachlorodisiloxane, and heptachlorotrisilane.

A preferred compound having silicon-bonded hydrogen useful in this invention is a polyorganohydrosiloxane having the general formula:

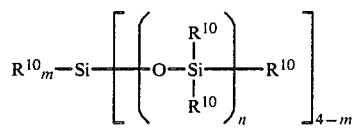

wherein each R$^{10}$ is independently hydrogen, an alkyl radical having 1 to 12 carbon atoms, a cycloalkyl radical having 3 to 12 carbon atoms, a phenyl radical, a hydroxyalkyl radical having 2 to 6 carbon atoms, or a (polyalkoxy)alkyl radical having 1 to 3 alkoxy radicals of which each alkyl radical has 1 to 3 carbon atoms, at least two but not more than 50% of all R$^{10}$ groups being hydrogen;

m is 0, 1, 2, or 3; and n is a number having an average value from 1 to 275 such that when considered with the value of m provides a molecular weight to the polyorganohydrosiloxane of between 134 and 20,000.

The hydrosilation compositions useful in the synthesis of low molecular weight compounds by the process of the invention can be prepared by mixing 0.1 to 10.0 equivalent weights (a) of the compound having silicon-bonded hydrogen with one equivalent weight of (b) the compound having aliphatic unsaturation and then adding an amount of platinum complex catalyst sufficient to catalyze the reaction. This amount can range from 5 to 1000 parts by weight, preferably from 50 to 200 parts by weight, of platinum complex catalyst per 1,000,000 parts by weight of the total composition.

In carrying out a hydrosilation reaction in the practice of this invention, the reactants and catalyst can be introduced into a vessel equipped for stirring, where the mixture is stirred until it is homogeneous. If either of the reactants is a solid or is extremely viscous, a solvent can be introduced into the vessel to facilitate uniform mixing of the reactants. Suitable solvents include aromatic hydrocarbons, such as xylene and toluene, aliphatic hydrocarbons, such as hexane and mineral spirits, and halogenated hydrocarbons, such as chlorobenzene and trichloroethane. Where the activating energy for the reaction is to be actinic radiation, it is desirable that the solvent be transmissive to the radiation. From 0.1 to 10 parts of solvent per part by weight of the combined reactants may be used. The resulting reaction product will generally be sufficiently pure for the use to which it is intended. However, it may be desirable to remove the solvent if one has been employed.

The hydrosilation compositions useful in the preparation of higher molecular weight cured siloxane polymers, by the process of this invention, can be prepared by mixing about 60 to about 99 parts by weight of an aliphatically unsaturated polysiloxane and about 1 to about 40 parts by weight of the compound having silicon-bonded hydrogen and then adding from 5 to 1000 parts by weight, preferably from about 50 to about 200 parts by weight of platinum complex catalyst per 1,000,000 parts by weight of the total curable composition. The actual ratio of compound having silicon-bonded hydrogen to aliphatically unsaturated polysiloxane can be adjusted so that about 0.1 to about 10 SiH groups are provided for each aliphatically unsaturated group, e.g.,

The reaction mixture can be mixed, as by stirring, blending, or tumbling, until it is homogeneous.

The thoroughly mixed composition can then be applied to a substrate by any suitable means, such as by spraying, dipping, knife coating, curtain coating, roll coating, or the like, and the coating cured. It is preferred that curing be conducted by exposing the coated substrate to actinic, preferably ultraviolet (UV), radiation. Depending on the particular silicone formulation, catalyst, and intensity of the ultraviolet radiation, curing can be accomplished in a period from less than 30 minutes to less than one second. Shorter curing times are preferred for the reason that greater production levels can be attained. Any radiation source emitting radiation below about 4000 Å can be used. Conventional low, medium, and high pressure mercury lamps are useful UV radiation sources. Examples of suitable radiation sources include lamps such as the GE H3T and the Hanovia 450 W arc lamp. Radiation sources rich in ultraviolet, such as fluorescent lamps, "street" lamps, and "black" lights are also useful. Particularly preferred sources of UV radiation are continuous processors which are capable of continuously exposing webs coated with the composition of the invention at rates up to about 300 meters per minute or more. Such processors are exemplified by the PPG Processor in which the radiation source is provided by medium pressure lamps each emitting about 32 watts/cm². With the PPG Processor, curing of coatings of the hydrosilation composition can be accomplished at a rate of about 15 meters/minute. Curing can also be accomplished by heating at a temperature of about 50° C. to 250° C. for 5 minutes to less than about 15 seconds, the higher temperatures requiring shorter times.

The hydrosilation reaction and curing process can be accelerated for some of the platinum complex catalysts, particularly at the longer wavelengths (e.g., wavelengths as emitted by "black" light sources), by including in the composition a soluble compound having an absorption bond at about 3300 to 3900 Å and a triplet energy of about 60 to 70 kcal mole$^{-1}$. Representative of these compounds are thioxanthene-9-one and 2-chlorothioxanthene-9-one.

Various additives can be included in the curable compositions, depending on the intended purpose of the composition. Fillers and/or pigments, such as chopped fibers, crushed polymers, talc, clay, titanium dioxide, and fumed silica can be added. Soluble dyes, oxidation inhibitors, and/or any material that does not interfere with the catalytic activity of the platinum complex and is transparent to ultraviolet radiation at a wavelength below about 4000 Å (if ultraviolet radiation is to be used to bring about the hydrosilation reaction) can be added to the composition.

The shelf life of the curable compositions containing the catalyst can be extended by the addition of a catalyst inhibitor. The amount of catalyst inhibitor can vary from about 1 to about 10 times or more the amount of platinum complex, depending on the activity of the particular complex or complex-accelerator used and the shelf life desired for the composition. Greater amounts of inhibitor should be used with the more active complexes, with lesser amounts being used for the less active complexes. Representative catalyst inhibitors include the acetylenic inhibitors, such as the acetylenic alcohols, particularly 3,5-dimethylhexyn-3-ol, and the olefinic siloxanes, such as polymethylvinylcyclosiloxane having three to six methylvinylsiloxane units per molecule.

The hydrosilation compositions of this invention can be applied to any solid surface for a variety of purposes. Examples of such surfaces include those of paper, cardboard, wood, cork, plastic such as polyester, nylon, polycarbonate, etc., woven and nonwoven fabric such as cotton, polyester, nylon, etc., metal, glass, and ceramic. The composition can be applied to the surface and cured thereon to provide a non-stick character to the surface. The composition is particularly suitable for providing a release coating for use in pressure sensitive tapes and sheets, for providing a non-stick surface for packaging sheets, and for providing a coating to containers used for the storage of sticky substances.

It is often advantageous to prime the surface of non-porous substrates to which the hydrosilation composition is to be applied to improve the adhesion of the composition to the substrate. Many primers are described in the art and should be chosen on the basis of the substrate to be used. For example, the epoxy-functional siloxanes as taught in U.S. Pat. No. 4,243,718 are useful for priming the surface of plastic films such as polyester and polyvinylchloride.

Advantages of this invention are further illustrated by the following examples, where the parts referred to are parts by weight. The particular materials and amounts recited as well as other conditions and details given should not be construed to unduly limit this invention.

EXAMPLES 1–21

A stock composition was prepared by mixing in a glass container 97.5 parts by weight of vinyl-terminated polysiloxane having the formula:

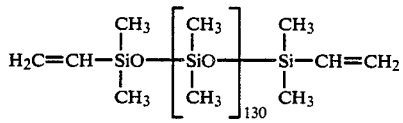

and 2.5 parts by weight of a compound containing silicon-bonded hydrogen group (available as DC 1107 from Dow Corning Corporation) having the formula:

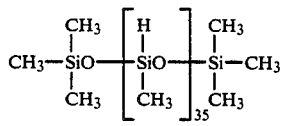

To 10 gram portions of the stock composition was added 5 to 10 milligrams of the (η-diolefin)(σ-aryl)-platinum hydrosilation catalysts listed in Table I, resulting in a composition containing 180 parts of platinum per million parts of total composition. Each composition was thoroughly mixed. A first portion of each 10 gram portion of the composition was sealed into an amber vial, and the time measured and recorded in Table I for the composition to react at 23° C. to a state in which it would no longer flow when the vial was turned end over end. This time is referred to as the "dark gel time". A second and a third portion of each 10 gram portion of the composition was hand coated at a coating weight of approximately 4 grams per square meter (1 grain/24 in$^2$) onto 75 micrometer thick polyester film. The second portion of each coating was then exposed to the radiation of a 20 watt black light lamp at a distance of 2.5 cm, and the third portion of each coating was exposed in a PPG Processor that advanced the sample at a rate of 100 cm/second past a medium pressure ultraviolet lamp emitting 30 watts of radiation per centimeter of length. The time required to convert each coating to a non-smearing surface when it was exposed to the radiation from a 20 watt black light at a distance of 2.5 cm is recorded in Table I. The number of passes through the PPG Processor required to convert the coating to a non-smearing surface is also recorded in Table I.

data that the platinum complexes of Examples C, D and E are much less effective as catalysts for black light initiated curing than are the preferred σ-aryl platinum complexes. The black light gel time of the compositions of Examples 1–14, 16 and 18–21 exhibited values ranging from 2 to 5 minutes. The composition of Example 17 exhibited a black light gel time of 15 minutes. The black light gel times of the compositions of Comparative Examples C and E were 10 minutes and the black light gel time of the composition of Comparative Example D was 700 minutes. Although the dimethyl complex (Comparative Example C) had a slow black light gel time, it did have a long dark gel time. It is apparent from inspection of Table II that the platinum complexes not containing σ-bonded hyrocarbyl groups, Examples A and B, are not effective for radiation curing because they do not result in the composition being cured even after 6 passes of the PPG Processor.

TABLE I

| Ex. No. | (η-Diolefin)(σ-aryl)platinum catalyst used | Dark gel time | Passes through PPG Processor | Black Light gel time, min |
|---|---|---|---|---|
| 1 | (η$^4$-1,5-COD)Pt(phenyl)$_2$[a] | 300 min | — | 4–4.5 |
| 2 | (η$^4$-1,5-COD)Pt(4-methylphenyl)$_2$ | 300 min | 1 | 4 |
| 3 | (η$^4$-1,5-COD)Pt (3-methylphenyl)$_2$ | 780 min | 1 | 4 |
| 4 | (η$^4$-1,5-COD)Pt(2-methylphenyl)$_2$ | 180 min | 1 | 2–2.5 |
| 5 | (η$^4$-1,5-COD)Pt(4-methoxyphenyl)$_2$ | 1440 min | 1[c] | 2–2.5 |
| 6 | (η$^4$-1,5-COD)Pt(4-ethoxyphenyl)$_2$ | 960 min | 1[c] | 4.5 |
| 7 | (η$^4$-1,5-COD)Pt(4-phenoxyphenyl)$_2$ | 1200 min | 1 | 3–3.5 |
| 8 | (η$^4$-1,5-COD)Pt(4-methylmercaptophenyl)$_2$ | 1140 min | — | 3.5–4 |
| 9 | (η$^4$-1,5-COD)Pt(4-trimethylsilylphenyl)$_2$ | 2100 min | 1 | 2.5–3.5 |
| 10 | (η$^4$-1,5-COD)Pt(4-trimethylsiloxyphenyl)$_2$ | 180 min | — | 3.5 |
| 11 | (η$^4$-1,5-COD)Pt(4-trifluoromethylphenyl)$_2$ | 7200 min | 1 | 4.5–5 |
| 12 | (η$^4$-1,5-COD)Pt(3-trifluoromethylphenyl)$_2$ | 7050 min | 1 | 2.5–3.5 |
| 13 | (η$^4$-1,5-COD)Pt(2-trifluoromethylphenyl)$_2$ | 3000 min | 1 | 3.5 |
| 14 | (η$^4$-1,5-COD)Pt(4-fluorophenyl)$_2$ | 420 min | — | 2.5 |
| 15 | (η$^4$-1,5-COD)Pt(4-dimethylaminophenyl)$_2$ | 4 min | — | — |
| 16 | (η$^4$-1,5-COD)Pt(4-acetylphenyl)$_2$[b] | 350 hr | 7 | 3–3.5 |
| 17 | (η$^4$-1,5-COD)Pt(perfluorophenyl)$_2$ | 2200 hr | 3 | 15 |
| 18 | (η$^4$-1,5-COD)Pt(2,4,6 trifluorophenyl)$_2$ | 2200 hr | 1 | 3.5 |
| 19 | (η$^4$-1,5-COD)Pt(1,4,5 trifluorophenyl)$_2$ | 500 hr | 1[c] | 3.5 |
| 20 | (η$^4$-1,5-COD)Pt(2-trifluoromethyl-3-chlorophenyl)$_2$ | 7000 min | 1[c] | 3.5 |
| 21 | (η$^4$-1,5-COD)Pt [4-(pentamethylsiloxysilyl)-ethylphenyl]$_2$ | 300 min | 1 | 2.5–3 |

[a]COD is abbreviation for cyclooctadiene
[b]Only 25 ppm of platinum was used in the composition
[c]Cured at a rate of 70 cm/sec.

COMPARATIVE EXAMPLES A–E

The procedure of Examples 1–21 was repeated, the only exception being that platinum hydrosilation catalysts not within the scope of the invention, i.e., Examples A and B, and catalysts within the scope of the invention, but where R$^2$ and R$^3$ are alkyl radicals, i.e., Examples C, D and E, were used. The results are recorded in Table II.

TABLE II

| Ex. No. | Platinum catalyst used | Dark gel time, min | Passes through PPG Processor | Black Light gel time, min |
|---|---|---|---|---|
| A | H$_2$PtCl$_6$ | 360 | 6[a] | >60 |
| B | (η$^4$-1,5-COD)PtCl$_2$ | <60 | 6[a] | — |
| C | (η$^4$-1,5-COD)Pt(methyl)$_2$ | 2460 | 3 | 10 |
| D | (η$^4$-1,5-COD)Pt(isopropyl)$_2$ | 8 | — | 700 |
| E | (η$^4$-1,5-COD)Pt(benzyl)$_2$ | 60 | 2 | 10 |

[a]These compositions did not cure after 6 passes through the PPG Processor.

Although the data in Tables I and II show that all of the platinum catalysts having an ultraviolet displaceable group are effective, it is apparent from inspection of the The stability of the compositions of the present invention, as evidenced by dark gel time, is superior to that of compositions of the prior art. The compositions of Examples 1–14 and 16–21 had dark gel times exceeding 180 minutes. The compositions of Comparative Examples D and E had dark gel times of 8 and 60 minutes, respectively.

EXAMPLES 22–26

These examples demonstrate the non-stick character of coatings produced with the composition of this invention.

The compositions of Examples 2, 5, 12, 18, and 21 were tested for release value and readhesion value. The compositions were hand coated at a coating weight of approximately 4 grams per square meter (1 grain/24 in$^2$) onto (1) super calendered Kraft paper and (2) paper coated with polyethylene. Each coated substrate was exposed in a PPG Processor that advanced the sample at a rate of 100 cm/second past a medium pressure ultraviolet lamp emitting 30 watts of radiation per centimeter of length.

The release value of the cured silicone coating was determined by the following procedure:

A heptane-isopropanol solution of pressure-sensitive adhesive comprising 95.5:4.5 isooctyl acrylate:acrylic acid copolymer, as described in Example 5 of U.S. Pat. No. Re. 24,906, incorporated herein by reference, was applied to the cured silicone coatings at a coating weight of 32 g/m² (dry weight) and dried for 5 minutes at 70° C. in a circulating air oven. Then a 38 micrometer biaxially oriented film of polyethylene terephthalate (PET) was pressed against the surface of the coating producing a laminate consisting of a pressure-sensitive adhesive tape and a silicone-coated substrate. The laminate was cut into 2.5×25 cm strips. The "release value" was the force required to pull the PET film with adhesive adhered thereto (i.e., a pressure-sensitive adhesive tape) away from the silicone-coated substrate at an angle of 180° and a pulling speed of 230 cm/min.

The average of release value observed for strips having each polysiloxane coating composition is recorded in Table III.

The readhesion values of the pressure-sensitive tapes were determined by the following procedure:

The pressure-sensitive tapes, as removed from the silicone-coated surface, were applied to the surface of a clean glass plate. The readhesion value was measured by pulling the tape from the glass surface at an angle of 180° and a stripping speed of 230 cm/min. The readhesion value results are recorded in Table III.

TABLE III

| Ex. No. | (η-diolefin)(σ-aryl)platinum catalyst used | Release value (g/cm) | Readhesion value (g/cm) |
|---|---|---|---|
| 22 | (η⁴-1,5-COD)Pt(4-methylphenyl)₂$^{(a)}$ | 3.2 | 580 |
| 23 | (η⁴-1,5-COD)Pt(4-methoxyphenyl)₂$^{(a)}$ | 2.4 | 570 |
| 24 | (η⁴-1,5-COD)Pt(3-trifluoromethylphenyl)₂$^{(b)}$ | 2.4 | 560 |
| 25 | (η⁴-1,5-COD)Pt(2,4,6-trifluorophenyl)₂$^{(b)}$ | 3.2 | 600 |
| 26 | (η⁴-1,5-COD)Pt[4-(pentamethylsiloxysilyl)-ethylphenyl]₂$^{(b)}$ | 2.2 | 580 |
| | Adhesion control | | 620 |

$^{(a)}$Substrate was 60 lb brown super calendered Kraft paper (105 g/m²)
$^{(b)}$Substrate was polyethylene coated paper It is apparent from Table III that the silicone compositions of the present invention can be radiation-cured to provide surfaces having relatively low release values (i.e., less than 5 g/cm) for an acrylic pressure-sensitive adhesive, while not appreciably reducing the effectiveness of the adhesive, as determined by readhesion value.

Various modifications and alterations of this invention will become apparent to those skilled in the art without departing from the scope and spirit of this invention, and it should be understood that this invention is not to be unduly limited to the ilustrative embodiments set forth herein.

What is claimed is:

1. In a hydrosilation process which comprises reacting a composition comprising a compound having aliphatic unsaturation and a compound containing at least one silicon-bonded hydrogen atom and not having more than two hydrogen atoms attached to any one silicon atom, in the presence of a platinum catalyst, the improvement which comprises using as the platinum catalyst, a (η-diolefin)(σ-aryl) platinum complex having an ultraviolet displaceable group.

2. The process of claim 1 wherein said reaction is carried out by means of exposing said composition to actinic radiation.

3. The process of claim 2 wherein the platinum complex is represented by the formula:

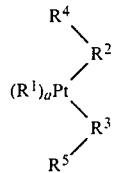

wherein
R¹ is an alkadiene that is π-bonded to platinum, the alkadiene having a straight or branched chain or a cyclic ring, the alkadiene further being unsubstituted or substituted by one or more groups that are inert in a hydrosilation reaction;
R² and R³ are aryl radicals that are σ-bonded to platinum and are independently selected from monocyclic and polycyclic aryl radicals, said aryl radicals being unsubstituted or substituted by one or more radicals that are inert in a hydrosilation reaction;
R⁴ and R⁵ are independently hydrogen or an ortho-alkenyl radical, said alkenyl radical being in a straight or branched chain or in a 5- or 6-membered ring, the unsaturated bond of the alkenyl radical being in the 2- or 3-position with respect to the σ-bonded position;
a is zero or one, being zero only when both R⁴ and R⁵ are ortho-alkenyl radicals, and one when either R⁴ or R⁵ is not an ortho-alkenyl radical.

4. The process of claim 3 wherein the platinum complex is selected from the group consisting of
(η⁴-1,5-COD)-bis(4-methoxyphenyl)platinum
(η⁴-1,5-COD)-bis-(4-trimethylsilylphenyl)platinum
(η⁴-1,5-COD)-bis(4-trifluoromethylphenyl)platinum
(η⁴-1,5-COD)-bis(3-trifluoromethylphenyl)platinum
(η⁴-1,5-COD)-bis(2-trifluoromethylphenyl)platinum
(η⁴-1,5-COD)-bis(2,4,6-trifluorophenyl)platinum.

5. The process of claim 1 wherein the composition comprises from 0.1 to 10.0 equivalent weights of the compound having silicon-bonded hydrogen per equivalent weight of the compound having aliphatic unsaturation, and, per 1,000,000 parts by weight of the total composition, from 5 to 1000 parts by weight of the platinum catalyst.

6. The process of claim 1 wherein the compound containing aliphatic unsaturation is a polyorganosiloxane having the general formula:

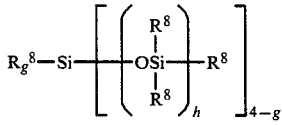

wherein
each $R^8$ is independently an unhalogenated or halogenated ethylenically-unsaturated radical, an unhalogenated or halogenated alkyl radical or cycloalkyl radical, or a phenyl radical, at least 90% of all $R^8$ radicals being methyl radicals, but no more than 10% of all $R^8$ radicals being vinyl or propenyl, and at least two of the $R^8$ radicals being vinyl or propenyl, h is a number having a value from about 75 to 250 such that the polyorganovinylsiloxane has a viscosity from about 0.3 to 3 pascal-seconds (300 to 3000 centipoise) at 25° C., and g is 0,1,2, or 3.

7. The process of claim 1 wherein the compound containing silicon-bonded hydrogen is a polyorganohydrosiloxane having the general formula:

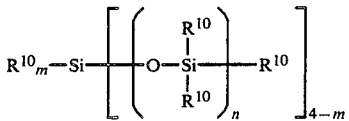

wherein
each $R^{10}$ is independently an alkyl radical, a cycloalkyl radical, a phenyl radical, a hydroxyalkyl radical, a (polyalkoxy)alkyl radical, or hydrogen, at least two but no more than 50% of all $R^{10}$ groups being hydrogen, m is 0, 1, 2 or 3, and n is a number having an average value from one to 275 such that when considered with the value of provides a molecular weight to the polyorganohydrosiloxane of between 134 and 20,000.

8. The process of claim 7 wherein the composition comprises from 1 to 40 parts by weight of the polyorganohydrosiloxane, from 60 to 99 parts by weight of the compound having aliphatic unsaturation, and, per 1,000,000 parts by weight of the total composition, from 5 to 1000 parts by weight of the platinum complex.

9. The process of claim 1 wherein the compound having aliphatic unsaturation is one having olefinic unsaturation.

10. A composition which comprises
(a) a silicon compound containing at least one hydrogen atom attached to silicon per molecule, there being not more than two hydrogen atoms attached to any one silicon atom,
(b) a compound containing aliphatic unsaturation, and
(c) a ($\eta$-diolefin)($\sigma$-aryl)platinum complex having an ultraviolet displaceable group.

11. The composition of claim 10 wherein the platinum complex is represented by the formula:

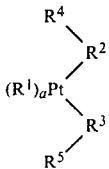

wherein
$R^1$ is an alkadiene that is $\pi$-bonded to platinum, the alkadiene being a straight or branched chain or a cyclic ring, the alkadiene further being unsubstituted or substituted by one or more groups that are inert in a hydrosilation reaction;

$R^2$ and $R^3$ are aryl radicals that are $\sigma$-bonded to platinum and are independently selected from monocyclic and polycyclic aryl radicals said aryl radicals being unsubstituted or substituted by one or more radicals that are inert in a hydrosilation reaction;

$R^4$ and $R^5$ are independently hydrogen or an ortho-alkenyl radical, said alkenyl radical being in a straight or branched chain or in a ring, the unsaturated bond of the alkenyl radical being in the 2- or 3-position with respect to the $\sigma$-bonded position;

a is zero or one, being zero only when both $R^4$ and $R^5$ are ortho-alkenyl radicals, and one when either $R^4$ or $R^5$ is not an ortho-alkenyl radical.

12. The composition of claim 11 wherein the platinum complex is selected from the group consisting of
($\eta^4$-1,5-COD)-bis(4-methoxyphenyl)platinum
($\eta^4$-1,5-COD)-bis(4-trimethylsilylphenyl)platinum
($\eta^4$-1,5-COD)-bis(4-trifluoromethylphenyl)platinum
($\eta^4$-1,5-COD)-bis(3-trifluoromethylphenyl)platinum
($\eta^4$-1,5-COD)-bis(2-trifluoromethylphenyl)platinum
($\eta^4$-1,5-COD)-bis(2,4,6-trifluorophenyl)platinum.

13. The composition of claim 10, said composition comprising from 0.1 to 10.0 equivalent weights of the compound having silicon-bonded hydrogen per equivalent weight of the compound having aliphatic unsaturation, and, per 1,000,000 parts by weight of the total composition, from 5 to 1000 parts by weight of the platinum complex.

14. Radiation curable composition comprising
(a) polyorganohydrosiloxane having the general formula:

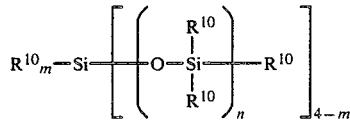

wherein
each $R^{10}$ is independently an alkyl radical, a cycloalkyl radical, a phenyl radical, a hydroxyalkyl radical, a (polyalkoxy)alkyl radical or hydrogen, at least two but no more than 50% of all $R^{10}$ groups being hydrogen;

m is 0, 1, 2 or 3, and n is a number having an average value from one to 275 such that when considered with the value of m provides a molecular weight to the polyorganohydrosiloxane of between 134 and 20,000, (b) a polyorganosiloxane having the general formula:

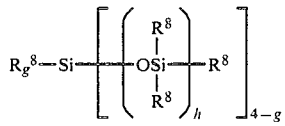

wherein
each $R^8$ is independently an unhalogenated or halogenated ethylenically unsaturated radical; an unhalogenated or halogenated alkyl radical or cycloalkyl radical, or the phenyl radical, at least 90% of all $R^8$ radicals being methyl radicals, but no more than 10% of all $R^8$ radicals being vinyl or propenyl, and at least two of the $R^8$ radicals being vinyl or propenyl, h is a number having a value from about 75 to 250 such that the polyorganovinylsiloxane has a viscosity from about 0.3 to 3 pascal-seconds (300 to 3000 centipoise) at 25° C., and g is 0,1,2, or 3, (c) a platinum complex represented by the formula:

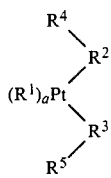

wherein $R^1$ is an alkadiene that is $\pi$-bonded to platinum, the alkadiene being a straight or branched chain or a cyclic ring, the alkadiene further being unsubstituted or substituted by one or more groups that are inert in a hydrosilation reaction;

$R^2$ and $R^3$ are aryl radicals that are $\sigma$-bonded to platinum and are independently selected from monocyclic and polycyclic aryl radicals, said aryl radicals being unsubstituted or substituted by one or more radicals that are inert in a hydrosilation reaction;

$R^4$ and $R^5$ are independently hydrogen or an ortho-alkenyl radical, said alkenyl radical being in a straight or branched chain or in a ring, the unsaturated bond of the alkenyl radical being in the 2- or 3-position with respect to the $\sigma$-bonded position;

a is zero or one, being zero only when both $R^4$ and $R^5$ are ortho-alkenyl radicals, and one when either $R^4$ or $R^5$ is not an ortho-alkenyl radical.

15. The composition of claim 14, said composition comprising from 60 to 99 parts by weight of the polyorganosiloxane, from about 1 to about 40 parts by weight of the polyorganohydrosiloxane, and, per 1,000,000 parts by weight of the total composition, from 5 to 1000 parts by weight of the platinum complex.

16. The composition of claim 14 wherein the platinum complex is selected from the group consisting of
($\eta^4$-1,5-COD)-bis(4-methoxyphenyl)platinum
($\eta^4$-1,5-COD)-bis(4-trimethylsilylphenyl)platinum
($\eta^4$-1,5-COD)-bis(4-trifluoromethylphenyl)platinum
($\eta^4$-1,5-COD)-bis(3-trifluoromethylphenyl)platinum
($\eta^4$-1,5-COD)-bis(2-trifluoromethylphenyl)platinum
($\eta^4$-1,5-COD)-bis(2,4,6-trifluorophenyl)platinum.

17. A substrate bearing on at least one major surface a layer prepared by applying the composition of claim 14 to said surface and then exposing said composition to actinic radiation.

18. Sheet material provided with a release surface prepared by applying on at least one side of said sheet material the composition of claim 14 and then exposing said composition to actinic radiation, and a layer of normally tacky and pressure-sensitive adhesive bonded firmly to the other side of said sheet material, thereby forming a pressure-sensitive adhesive tape.

* * * * *

UNITED STATES PATENT AND TRADEMARK OFFICE
CERTIFICATE OF CORRECTION

PATENT NO. : 4,530,879
DATED : July 23, 1985
INVENTOR(S) : Timothy J. Drahnak

It is certified that error appears in the above-identified patent and that said Letters Patent is hereby corrected as shown below:

Col. 7, line 47, "alkyl, radicals" should read --alkyl radicals--.

Col. 12, line 15, "hyrocarbyl" should read --hydrocarbyl--.

Col. 15, line 33, "value of provides" should read --value of m provides--.

Signed and Sealed this

Fifteenth Day of October 1985

[SEAL]

Attest:

DONALD J. QUIGG

Attesting Officer

Commissioner of Patents and
Trademarks—Designate